Jan. 1, 1952 T. VIGMOSTAD 2,580,486
COLLAPSIBLE TOP FOR VEHICLES
Filed June 5, 1948 3 Sheets-Sheet 1

INVENTOR.
Trygve Vigmostad
BY
Elmer Jamison Gray
ATTORNEY.

Jan. 1, 1952     T. VIGMOSTAD     2,580,486
COLLAPSIBLE TOP FOR VEHICLES
Filed June 5, 1948     3 Sheets-Sheet 3
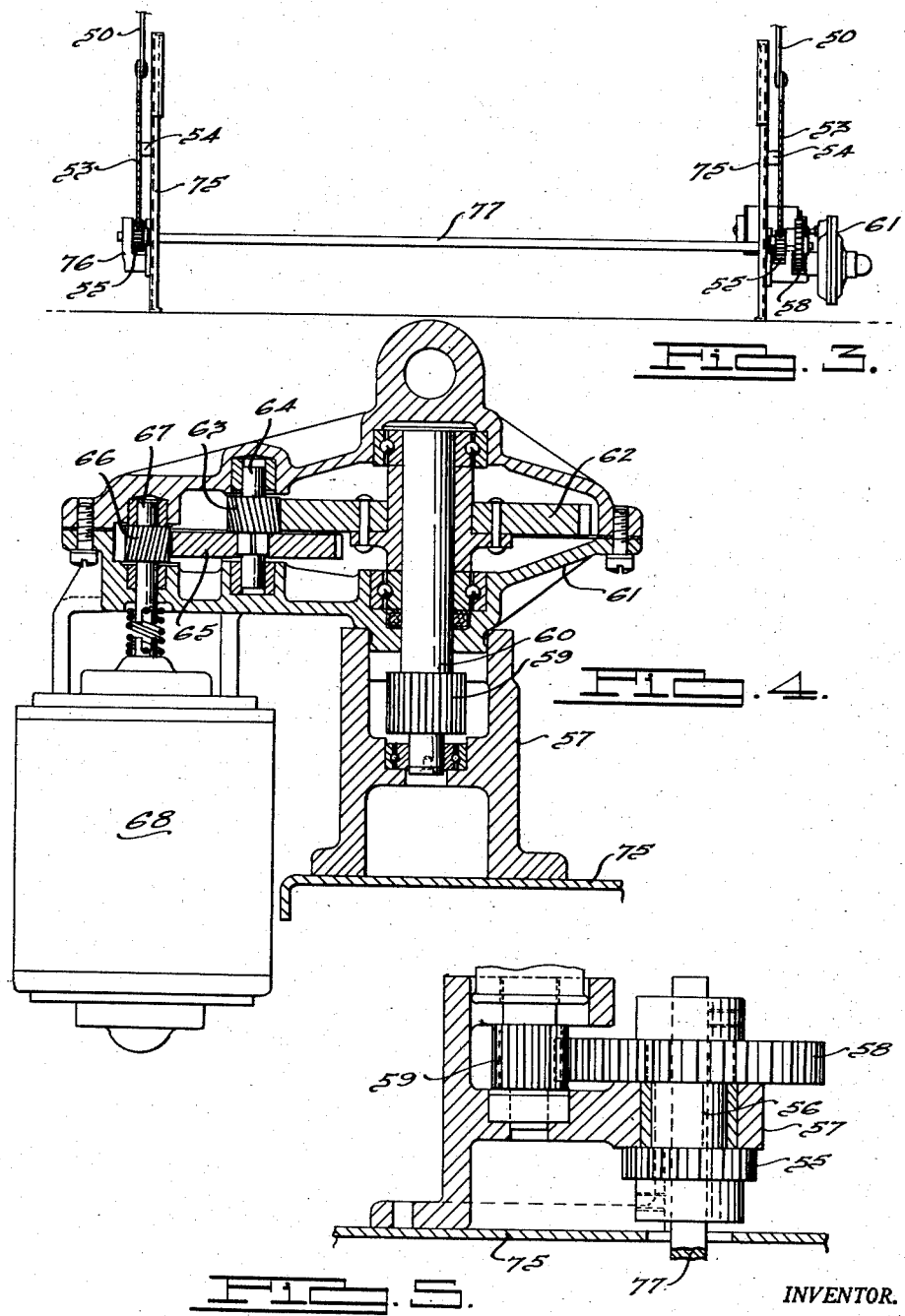
INVENTOR.
Trygve Vigmostad.
BY
Elmer Jamison Gray
ATTORNEY.

UNITED STATES PATENT OFFICE 2,580,486

COLLAPSIBLE TOP FOR VEHICLES

Trygve Vigmostad, Detroit, Mich., assignor to Briggs Manufacturing Company, Detroit, Mich., a corporation of Michigan Application June 5, 1948, Serial No. 31,305

4 Claims. (Cl. 296—117)

This invention relates to vehicle bodies and more particularly to automobile bodies of the so-called convertible type having foldable or collapsible tops.

An object of the invention is to provide an automobile or other vehicle body of the convertible type having a foldable top assembly, including a fabric covering, which is of improved construction capable of being positively unfolded into open position so as to assume the desired position with respect to the sides of the body and the windshield header thereof, and also capable of being folded or collapsed into the body as a compact unit occupying a minimum of space.

A further object of the invention is to provide improved power driven mechanism for opening the top assembly and folding it into the body, the construction of the top assembly and the mechanism for operating it being such as to render the opening and folding movements of the top smoother, faster and more reliable than heretofore.

Another object of the invention is to provide an improved power driven mechanism for actuating the foldable top which requires the use of a single prime mover, such as a single reversible electric motor, and which ensures positive synchronized movement of the linkage and side rail sections at opposite sides of the top, thereby rendering more positive and smoother the operation of the top.

Still another object of the invention is to provide an improved operating mechanism for a foldable or collapsible top which utilizes two pairs of toggle links for moving the top through the medium of side rail sections thereof, each pair of toggle links being actuated by an endwise shiftable push and pull member or link which is reciprocated by means of gearing driven from an electric motor.

A further object of the invention is to provide a foldable top including articulated side rail sections and linkage at each side of the vehicle body, and wherein movement of the top is initiated and controlled by toggle mechanism at each side of the vehicle connected to corresponding rail sections at each side of the vehicle, the toggle mechanisms being actuated in synchronism by means of a single electric motor drivingly connected thereto.

Still another object of the invention is to provide in an automobile body a collapsible or foldable top having improved link, lever and side rail mechanism so constructed and arranged as to function efficiently and positively between the full open and closed limits of movement of the top, and in addition to provide improved power actuated means for operating said mechanism.

Other objects of this invention will appear in the following description and appended claims, reference being had to the accompanying drawings forming a part of this specification wherein like reference characters designate corresponding parts in the several views.

Fig. 3 is a fragmentary end elevation taken substantially from the arrow numbered 3 in Fig. 1.

Fig. 4 is an enlarged section taken substantially through lines 4—4 of Fig. 1 looking in the direction of the arrows.

Fig. 5 is an enlarged section taken substantially through lines 5—5 of Fig. 1 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 2:
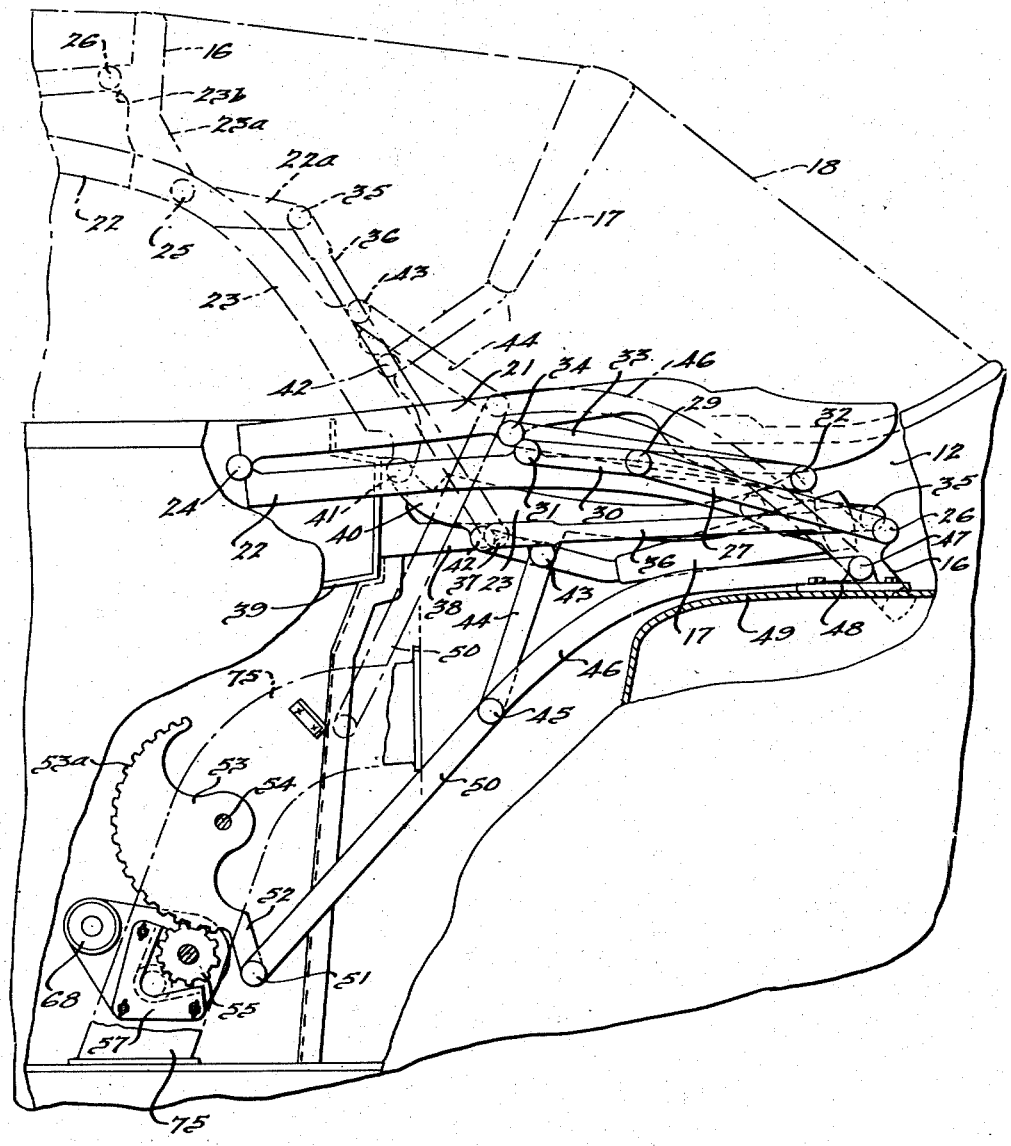
Fig. 2 is an enlarged fragmentary side elevation, partly in section and partly broken away, illustrating the top in its folded or collapsed condition within a compartment in the rear of the vehicle, a portion of the top when opened being shown in broken lines.

In the drawings there is illustrated, by way of example, a foldable or collapsible top constructed in accordance with one embodiment of the present invention as applied to a convertible body of the two door type. It will be understood that the invention may be utilized in connection with other types of vehicles or automobile bodies, such as convertible bodies of the four door type. The body A is provided with a door 10 at each side, a windshield 11, and a collapsible or foldable top B adapted to be folded into a compartment or space 12 located between the rear seat of the body and the rear deck compartment, as illustrated in Fig. 2.

The windshield 11 terminates at its upper edge in a rigid transverse header 13, and the collapsible top B terminates at its forward edge in a transverse hollow header 14 adapted to engage the upper edge of the header 13 and to be drawn down and clamped thereto by suitable manually operable mechanism located principally within the header 14 and actuated by means of a handle (not shown) accessible to the front seat passenger at a point above the windshield. When the header 14 of the foldable top is forced down into engagement with the header 13 of the windshield, it is preferably located in position by means of upright locating pins or studs on the windshield header 13. Although the clamping mechanism for securing the header 14 of the foldable top to the windshield header 13 may take any suitable form, it is preferably constructed in accordance with United States Letters Patent No. 2,411,945, issued Dec. 3, 1946.

The collapsible or foldable top B includes a front bow 15, an intermediate or middle bow 16, and a rear bow 17 over which the fabric 18 of the top is stretched, the fabric being securely fastened to these bows in any conventional manner. The opposite side edges of the fabric 18 are attached to the foldable side rails forming a part of the top assembly and hereinafter more fully described. The front edge portion of the fabric 18 covers and is secured to the header 14 and the rear edge thereof is attached to the body around the upper rear edge of the compartment 12. Slidably mounted within the door 10 in the usual manner is a glass panel 19. Mounted within the body immediately in rear of the slidable panel 19 is a glass quarter panel 20 which is preferably mounted so as to move upwardly or downwardly into a well within the body.

The construction of the foldable top with reference to the side rails and operating linkage for the bows 15, 16 and 17 is the same at each side of the body, and hence it will suffice to illustrate and describe the structure at one side of the body only. The foldable top is provided at each side with a sectional side rail extending from the header 14 to the rear of the body at a point adjacent the front upper edge of the compartment 12. This sectional side rail comprises a front rail section 21, an intermediate or middle rail section 22, and a rear rail section 23.

Figure 1:
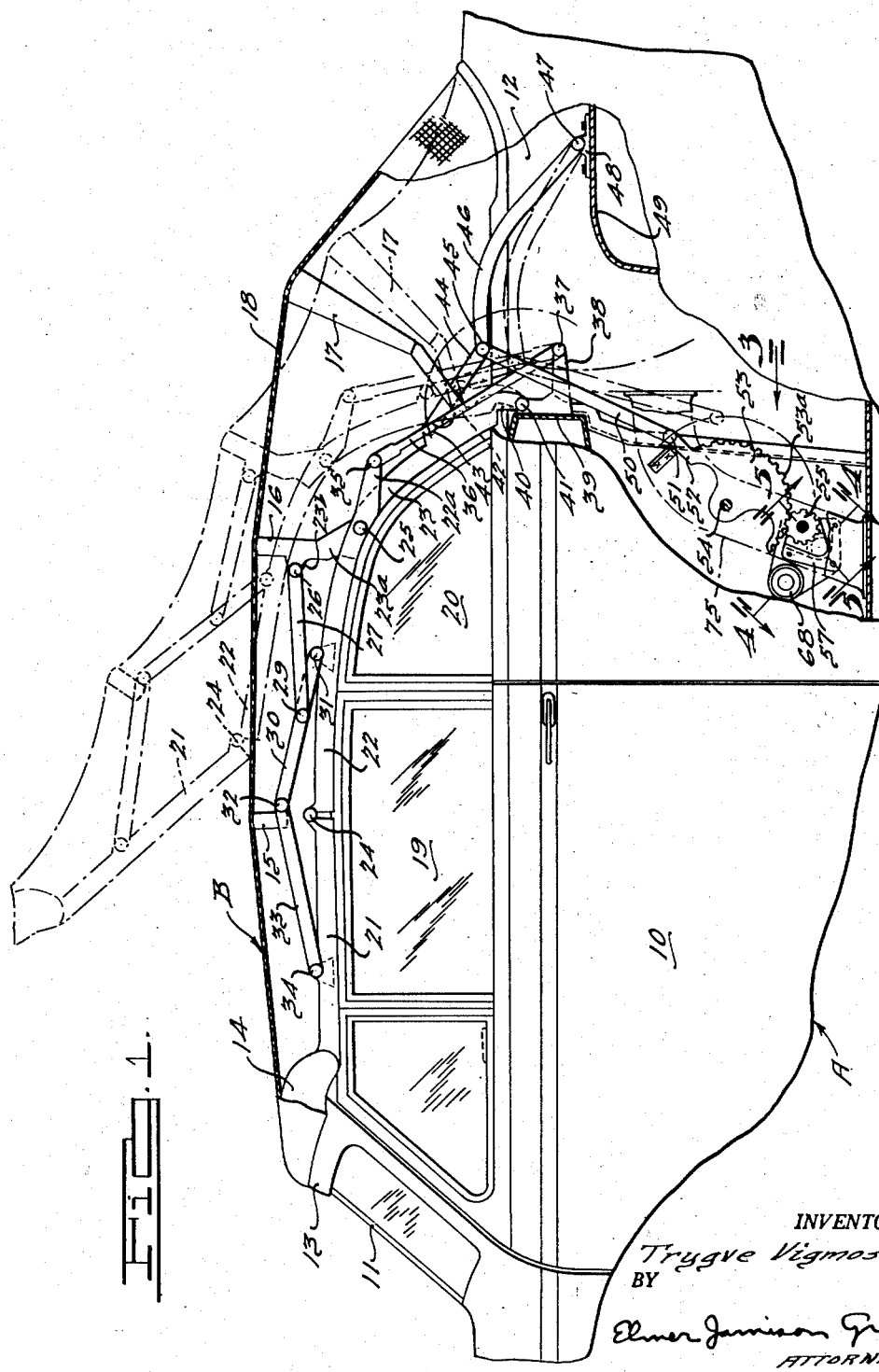
Fig. 1 is a fragmentary side elevation, partly broken away and in section, illustrating a foldable or collapsible top for an automobile body constructed in accordance with the present invention.

The rail sections 21 and 22 are arranged end to end in abutting relation when the top is open and are hinged together at 24 so that the front rail section 21 may fold back over the intermediate section 22 when the top is collapsed as shown in Fig. 2. The rear end of the rail section 22 overlaps the forward end of the rear rail section 23, and these sections are pivoted together at 25 at the regions where the sections overlap. The rear rail section 23 has a lever arm or extension 23a projecting beyond the pivot 25 and vertically when the top is open, as shown in Fig. 1. The extensions 23a at opposite sides of the vehicle are joined in any suitable manner to the ends of the middle bow 16.

Each extension 23a of the rear rail section has an offset arm 23b to which is pivoted at 26 a link 27. This link extends forwardly in the open position of the top and is pivoted at 29 to an intermediate portion of a link 30. This latter link is pivoted at 31 to the intermediate rail section 22 at a suitable point between the ends thereof and in normal open position of the top extends forwardly and upwardly with respect to the side rail section 22, as illustrated in Fig. 1. The inclined link 30 at its forward end is pivoted at 32 to a second inclined link 33 which extends downwardly and forwardly and is pivoted at its forward end at 34 to the front rail section 21 at a suitable point between the ends thereof. Thus, it will be seen that the arm or lever extension 23a of the rear rail section 23 is operatively connected to the front rail section through the medium of the articulated links 27, 30 and 33, power being transmitted by the lever extension 23a from a point well above the rail section 22. The link 30 is rigidly secured near the pivot 32 to an end of the front bow 15.

The intermediate side rail section 22 has an arm or lever extension 22a extending rearwardly of the pivot 25, and each of these arm extensions of the top is pivoted at its rear end at 35 to the upper end of a link or prop member 36. In the normal open position of the top each prop member 36 extends downwardly and rearwardly alongside the rear rail section 23 and is pivoted at its rear end at 37 to a bracket 38 rigidly secured to a cross frame member 39 of the body. The rear rail section 23 at each side of the body is provided with a rigid extension 40 which, in the open position of the top, extends downwardly and is pivoted at 41 to the bracket 38 at a point somewhat above and forwardly of the pivot 37 of the prop member 36. From the foregoing it will be seen that the rear rail sections 23 will swing between the open and closed positions of the top about the pivots 41 which, of course, lie on a common transverse axis. Each end of the rear bow 17 is pivoted at 42 to one of the rear rail sections 23 at a point suitably in advance of the axis of swinging of the rear rail section.

The foldable top in the present embodiment is operated through the medium of mechanism arranged at each side of the body and driven through a single reversible electric motor. Each of these mechanisms is connected to a rear rail section 23 and to a fixed portion of the body, and the construction is such that during operation of the electric motor the mechanism at opposite sides of the body will operate in synchronism to raise and lower the top with maximum smoothness. Each mechanism includes toggle links pivoted together and connected to the rear rail section 23 and to a fixed portion of the body, the toggle links being actuated to fold the top into the compartment 12, as shown in Fig. 2, or unfold and extend it to the open position shown in Fig. 1. A toggle link 44 is pivoted at its forward end at 43 to each of the rear rail sections 23 somewhat in advance of the pivotal connection 42 of the rear bow 17. The rear end of the toggle link 44 is pivoted at 45 to the forward end of a relatively long link 46 which in turn is pivoted at its rear end at 47 to a bracket 48 bolted to the deck 49 of the compartment 12. The links 44 and 46 provide a toggle interposed between the rear rail section and a fixed rear portion of the body, the pivot 45 between these links providing a toggle joint. The toggle 44, 46 at each side of the body is actuated by means of an endwise shiftable push and pull link 50 which is pivoted at its upper end to the toggle joint at the pivot 45. This link 50 extends downwardly and forwardly to a point immediately above the floor of the tonneau and its lower end is pivoted at 51 to a crank or lever arm 52 rigidly secured to a gear sector 53. This gear sector is suitably journalled at 54 on an upstanding bracket 75 rigidly secured to the side of the body.

Each gear sector 53 is provided with teeth 53a meshing with the teeth of a pinion 55. As illustrated in Fig. 3, the pinion 55 at the lefthand side of the body is secured to one end of a transverse shaft 77 extending through an aperture in the bracket 75 and journalled in a bracket 76 secured to the bracket 75. The shaft 77 extends from one side of the body to the other and, as illustrated in Fig. 5, extends through and is fixed to a shaft 56 to which the pinion 55 at the righthand side of the body is secured. Thus, through the medium of the transverse shaft 77 the pinions 55 at opposite sides of the body, which drive the sector gears 53, will operate in synchronism and, hence, will reciprocate the links 50 so as to actuate the toggle mechanisms 44, 46 at opposite sides of the body synchronously.

As illustrated in Figs. 4 and 5, the pinion 55 at the righthand side of the body is driven through suitable gearing from an electric motor. The shaft 56, to which this pinion 55 is secured, is suitably journalled in a bracket 57 and carries a gear 58 meshing with a pinion 59 secured to a shaft 60 journalled at one end in the bracket 57. The shaft 60 extends into and is journalled within a two-part reduction gear housing 61. The shaft 60 is driven by means of reduction gearing within this housing comprising a large gear 62 secured to the shaft and meshing with a pinion 63 secured to a shaft 64 also journalled in the housing. Attached to the shaft 64 is a gear 65 which meshes with a pinion 66 secured to a shaft 67 driven from an electric motor 68.

With the top in folded condition as shown in Fig. 2, operation of the electric motor 68, which may be initiated by a push button on the instrument panel, will simultaneously rotate the pinions 55 in synchronism due to the fact that the pinions are connected together by means of the transverse shaft 77. Upon rotation of the pinions 55 the gear sectors 53 will be rotated from the position shown in Fig. 2 to the position shown in Fig. 1. Due to their arrangement the lever arms 52 on the gear sectors 53 will transmit substantially an endwise upward movement to the toggle operating links 50. These operating links 50 will shift the toggle joints 45 in an upward direction, thus transmitting substantially a vertical endwise movement to the links 44 during the initial stages of the opening movement of the top.

It will be observed that the toggle 44, 46 comprises the operating connection between the main operating link 50 and the top assembly, the force exerted by this toggle at each side of the vehicle body being transmitted directly to the rear side rail section 23. Since the link 46 of this toggle is pivotally secured in place at the fixed point 47, the chief operating link 44 of the toggle is subjected to all of the motivating force of the toggle, which is considerable. It is important to note that the force exerted upon the top assembly by the chief operating link 44 of the toggle is greater at the initial stages of its movement. The toggle as well as the actuating link 50 therefor and the lever arm 52 on the gear sector 53 are so arranged that at the commencement of the opening movement of the top from the folded position thereof shown in Fig. 2 the links 44 and 50 move in unison in an upward endwise direction accompanied by a vertical movement of the pivot 51 on a relatively flat arc, thus gaining a considerable mechanical advantage during the initial stage of opening movement of the top. In like manner, a considerable motivating force is applied to the top assembly when initiating the folding or collapsing movement of the top from its full open position, the toggle link 44 being shifted rearwardly and downwardly in an endwise direction as the toggle joint is broken during the downward and endwise movement of the actuating link 50. As a result of the improved construction wherein the gear sectors 53, lever arms 52 and endwise shiftable links 50 are utilized in conjunction with the toggle links, greater power is available in shifting the top assembly as well as faster and smoother operation.

I claim:

1. In a vehicle body, a foldable top having side rail sections adapted to extend end to end when the top is open and including a rear side rail section pivotally connected to the body adjacent its rear end, a toggle link pivotally connected at one end to the rear rail section and shiftable generally endwise during the initial opening movement of the top, a second toggle link pivotally connected at one end to the body, adjacent ends of said links being pivotally connected together, a top operating link disposed generally endwise to the first named toggle link in the folded condition of the top and pivotally connected directly to one of said toggle links adjacent the pivotal connection therebetween, and means for imparting generally endwise shiftable motion to said operating link during the initial opening movement of the top, thereby to shift said first named toggle link also generally endwise, including a gear pivotally connected to said operating link.

2. In a vehicle body, a foldable top having side rail sections adapted to extend end to end when the top is open and including a rear side rail section pivotally connected to the body adjacent its rear end, a toggle link pivotally connected at one end to the rear rail section, a second toggle link pivotally connected at one end to the body, adjacent ends of said links being pivotally connected together at a toggle joint, and means to operate said top comprising a rotatable power operated gear and a generally endwise shiftable connecting link pivotally connected directly to one of said toggle links adjacent said toggle joint and eccentrically to said gear.

3. In a vehicle body, a foldable top having side rail sections adapted to extend end to end when the top is open and including a rear side rail section pivotally connected to the body adjacent its rear end, a toggle link pivotally connected at one end to the rear rail section and shiftable generally endwise during the initial movement from one limit of its travel, a second toggle link pivotally connected at one end to the body, adjacent ends of said links being pivotally connected together at a toggle joint, and means to operate said top comprising a rotatable power operated gear and a generally endwise shiftable connecting link pivotally connected directly to said toggle joint and eccentrically to said gear.

4. In a vehicle body, a foldable top having hingedly connected side rail sections adapted to extend end to end when the top is open and including a rear side rail section pivotally connected to the body at a point adjacent its rear end, a link pivoted at its rear end to the body adjacent said point and pivoted at its front end to the side rail section which is immediately forward of the rear side rail section, a toggle link pivotally connected at one end to the rear rail section, a second toggle link pivotally connected at one end to the body, adjacent ends of said links being pivotally connected together, a power driven rotatable gear, and a generally endwise shiftable link pivotally connected eccentrically to said gear for actuation thereby and pivotally connected directly to one of said toggle links, said last named link being disposed substantially endwise to said first named toggle link in the folded position of the top.

TRYGVE VIGMOSTAD.

REFERENCES CITED

The following references are of record in the file of this patent:

UNITED STATES PATENTS

| Number | Name | Date |
| --- | --- | --- |
| 1,674,573 | Salmons et al. | June 19, 1928 |
| 1,952,252 | Heuser | Mar. 27, 1934 |
| 2,255,289 | Keller | Sept. 9, 1941 |
| 2,272,299 | Ingildsen et al. | Feb. 10, 1942 |
| 2,309,926 | Baker | Feb. 2, 1943 |
| 2,372,583 | Keller | Mar. 27, 1945 |